(12) United States Patent
Di Zenzo

(10) Patent No.: US 9,170,635 B2
(45) Date of Patent: *Oct. 27, 2015

(54) METHODS, SYSTEMS, AND DEVICES FOR MANAGEMENT OF A MEMORY SYSTEM

(71) Applicant: Micron Technology, Inc., Boise, ID (US)

(72) Inventor: Maurizio Di Zenzo, Rocca Priora (IT)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/487,890

(22) Filed: Sep. 16, 2014

(65) Prior Publication Data

US 2015/0006844 A1     Jan. 1, 2015

Related U.S. Application Data

(63) Continuation of application No. 13/311,821, filed on Dec. 6, 2011, now Pat. No. 8,838,930, which is a continuation of application No. 11/926,324, filed on Oct. 29, 2007, now Pat. No. 8,082,387.

(51) Int. Cl.
```
G06F 12/02      (2006.01)
G06F 1/32       (2006.01)
G06F 3/06       (2006.01)
```
(52) U.S. Cl.
CPC ............ *G06F 1/3225* (2013.01); *G06F 1/3203* (2013.01); *G06F 3/0625* (2013.01); *G06F 3/0653* (2013.01); *G06F 3/0673* (2013.01); *G06F 1/3206* (2013.01)

(58) Field of Classification Search
CPC ... G06F 1/3225; G06F 1/3203; G06F 1/3206; G06F 3/0625; G06F 3/0653; G06F 3/0673

USPC ................. 711/170, 154, 202, 203, E12.001, 711/E12.006

See application file for complete search history.

(56) References Cited

U.S. PATENT DOCUMENTS

| | | |
|---|---|---|
| 5,758,330 A | 5/1998 | Brown |
| 6,510,504 B2 | 1/2003 | Satyanarayanan |
| 6,618,789 B1 | 9/2003 | Okaue et al. |

(Continued)

FOREIGN PATENT DOCUMENTS

EP         557736 A2     11/2005

OTHER PUBLICATIONS

Tanenbaum, Andrew L., Structured Computer Organization, Third Edition, Hardware vs. Software, Dec. 1989, pp. 11-13.

(Continued)

*Primary Examiner* — Pierre-Michel Bataille
(74) *Attorney, Agent, or Firm* — TraskBritt

(57) ABSTRACT

Methods, devices, and systems for a memory management system within an electronic device are disclosed, such as those wherein the memory management system is external to and compatible with architectures of currently existing operating systems. One such memory management system may include a power savings manager configured to be invoked by a memory allocation manager. The power savings manager may also be configured to determine whether physical memory blocks should be active or inactive. Furthermore, the memory management system may include a driver configured to activate or deactivate a memory block in response to a system call from the power savings manager.

20 Claims, 7 Drawing Sheets

(56) References Cited

U.S. PATENT DOCUMENTS

| | | |
|---|---|---|
| 6,715,027 B2 | 3/2004 | Kim et al. |
| 6,925,544 B2 | 8/2005 | Gresham |
| 7,103,747 B2 | 9/2006 | Wilson et al. |
| 7,146,479 B2 * | 12/2006 | Li et al. ............ 711/170 |
| 7,181,516 B2 * | 2/2007 | Kaneda et al. ......... 711/171 |
| 7,345,940 B2 | 3/2008 | Oh |
| 7,526,086 B2 | 4/2009 | Kihara et al. |
| 8,015,385 B2 * | 9/2011 | Schopp ................ 711/171 |
| 8,082,387 B2 | 12/2011 | Di Zenzo |
| 2003/0212875 A1 | 11/2003 | Gresham |
| 2006/0069898 A1 | 3/2006 | Patel et al. |
| 2006/0095427 A1 | 5/2006 | Dickenson |
| 2006/0129753 A1 | 6/2006 | Hasbun |
| 2006/0195707 A1 | 8/2006 | Rychlik |
| 2007/0100916 A1 | 5/2007 | Konecny |
| 2007/0106875 A1 | 5/2007 | Mather |
| 2008/0189473 A1 | 8/2008 | Murray |
| 2009/0113162 A1 | 4/2009 | Di-Zenzo |
| 2011/0170367 A1 | 7/2011 | Kim et al. |
| 2012/0079219 A1 | 3/2012 | Di Zenzo |

OTHER PUBLICATIONS

Maayan et al., A 512Mb NROM Flash Data Storage Memory with 8MB/s Data Rate, ISSCC 2002/Session 6/SRAM and Non-Volatile Memories/6.1, 2002 IEEE International Solid-State Circuits Conference, Digest of Technical Papers, (2002), pp. 100-101.

* cited by examiner

METHODS, SYSTEMS, AND DEVICES FOR MANAGEMENT OF A MEMORY SYSTEM

CROSS-REFERENCE TO RELATED APPLICATIONS

This application is a continuation of U.S. patent application Ser. No. 13/311,821, now U.S. Pat. No. 8,838,930, issued Sep. 16, 2014, which application is a continuation of U.S. patent application Ser. No. 11/926,324, filed Oct. 29, 2007, now U.S. Pat. No. 8,082,387, issued Dec. 20, 2011, the disclosure of each of which is hereby incorporated herein in its entirety by this reference.

FIELD

Embodiments of the present invention relate to memory. More specifically, one or more embodiments of the present invention relate to the management of memory resources within an electronic device.

BACKGROUND

Electronic devices have become increasingly popular in recent years. Electronic devices may include, for example, personal digital assistants (PDAs), cellular telephones, portable media players, digital cameras, or personal computers. Such electronic devices are typically microprocessor-based, equipped with one or more operating systems, and frequently include one or more types of memory resources, such as volatile and non-volatile memories. Although extremely useful, electronic devices often come with related disadvantages, including limited computing power, limited memory resources, and a finite power life. Power life may depend not only on the type and/or size of battery used in a particular device, but also on particular power management and memory management systems utilized in an electronic device.

Conventionally, computer memory is managed in blocks and segments. A memory block may refer to a partition of memory, wherein given a specific memory device, a memory block size is fixed. A memory segment may refer to a partition of memory having an unfixed size that may, depending on the system hardware, be dynamically generated and allocated for use by a computer program or application. A memory segment starts at a given physical memory address and has a certain partition length. For example, each memory block within a computer system may include a plurality of memory segments or one memory segment may be spread out over multiple memory blocks.

Applications, such as a user application or an operating system application, need memory resources to execute or store data. Since memory resources in an electronic device are limited, memory segments are allocated to each application, as the application requires. Embedded processors, as well as other processors, generally use a memory manager to manage memory resources. When an application needs additional memory resources, the application makes a memory allocation request to the memory manager. Thereafter, the memory manager locates a segment of free memory that is typically larger than that of the request, and allocates the requested memory to the application. When the application is finished, or the application no longer needs the memory, the application informs the memory manager that the memory segment may be de-allocated. In response, the memory manager then places the memory segment back in the memory pool where it becomes available for a future allocation.

Volatile memories, such as dynamic random access memories (DRAMs) or static random access memories (SRAMs), are commonly used in electronic devices. Unlike non-volatile memories, volatile memories need continuous refreshing and, thus, require power for maintaining data stored in the memory. However, in portable electronic devices, such as PDAs, cellular telephones, laptops and other portable computing devices, it is desirable to reduce power consumption as much as possible to maximize the available "on time" for the electronic device. Therefore, some memory devices, such as low-power DRAMs and cellular random access memories (CRAMs) may include partial array refresh (PAR) functionality. PAR is a hardware feature that may allow for the disablement of the refresh functionality of particular memory blocks. Using a PAR implementation, only memory blocks containing data are refreshed. Memory blocks that do not contain data are not refreshed and, as a result, power consumption of the memory device may be reduced. Currently, PAR is a complex hardware feature that is not automatically compatible with existing commercial operating systems.

FIG. 1 illustrates a conventional system memory 110 within an electronic device. As known in the art, system memory 110 may include system resources, such as a code area 102, a stack area 104, and a system heap 106. System heap 106 includes all of the unallocated memory segments within system memory 110 that remain after an operating system 112 has been initialized. System memory 110 also includes a memory allocation manager 114 and a memory allocation table 116, both of which may be configured as modules of operating system 112. Memory allocation manager 114 may control system heap 106 and may allocate memory segments within system heap 106 for use by an application in order to perform a task. Upon completion of a task, memory allocation manager 114 may de-allocate the memory segment used for the task and the de-allocated memory segment may then be returned to system heap 106. In order to track and assist in the allocation and de-allocation of memory resources, memory allocation table 116 may include a listing of the memory blocks within a memory device, all existing memory segments, the size of each memory segment, the starting address, and the status of the memory segments, such as "available" or "in use." In a conventional system memory, memory allocation manager 114 has no knowledge of the memory blocks within a memory device and, therefore, memory allocation manager 114 cannot enable or disable a memory block's refresh functionality. As a result, each memory block within the memory device, independent of whether the memory block includes allocated memory segments, remains "on" at all times during operation of the electronic device and, therefore, continuously consumes power whether or not the memory block is being utilized.

FIG. 2 illustrates a conventional memory management system 200 within an electronic device. Memory management system 200 includes one or more application programs 204, operating system 112, memory allocation manager 114, memory allocation table 116, and memory devices 206. As mentioned above, memory allocation table 116 includes an entry for each memory block and memory segment within memory devices 206. Furthermore, in order for memory allocation table 116 to provide the starting address, size, and status of each memory segment, each memory segment entry in memory allocation table 116 may be dynamically mapped (shown by arrows 210) to one or more physical memory segments (206(1) . . . 206(n)) within memory devices 206. Although memory devices 206 may include PAR functionality, conventional memory management system 200 is not automatically compatible with a PAR feature and, therefore, all memory blocks within memory devices 206 remain active at all times.

During operation of conventional memory management system 200, at least one application of application programs 204 may initiate a system call to memory allocation manager 114 to acquire additional memory resources from system heap 106 (see FIG. 1). Upon receiving the system call for memory acquisition, memory allocation manager 114 may search memory allocation table 116 to find a memory portion to satisfy the memory request. Upon finding a memory portion, memory allocation manager 114 allocates available memory segments 206(1) . . . 206(n) to the application requesting the memory resources. Additionally, at least one application of application programs 204 may initiate a system call to memory allocation manager 114 to release memory segments 206(1) . . . 206(n) being utilized by the application. Upon receiving the memory release system call, memory allocation manager 114 may de-allocate the memory segments from the application and the memory segments 206(1) . . . 206(n) may be returned to system heap 106.

There is a need for methods, systems, and devices to enhance the memory management of an electronic device, such as to allow for enhanced power savings. Specifically, there is a need for a memory management system that is compatible with currently available operating systems and which may allow for the reduction of power consumption by activating and deactivating memory blocks dependent on whether the memory blocks are being utilized by an electronic device.

DETAILED DESCRIPTION

Figure 1:
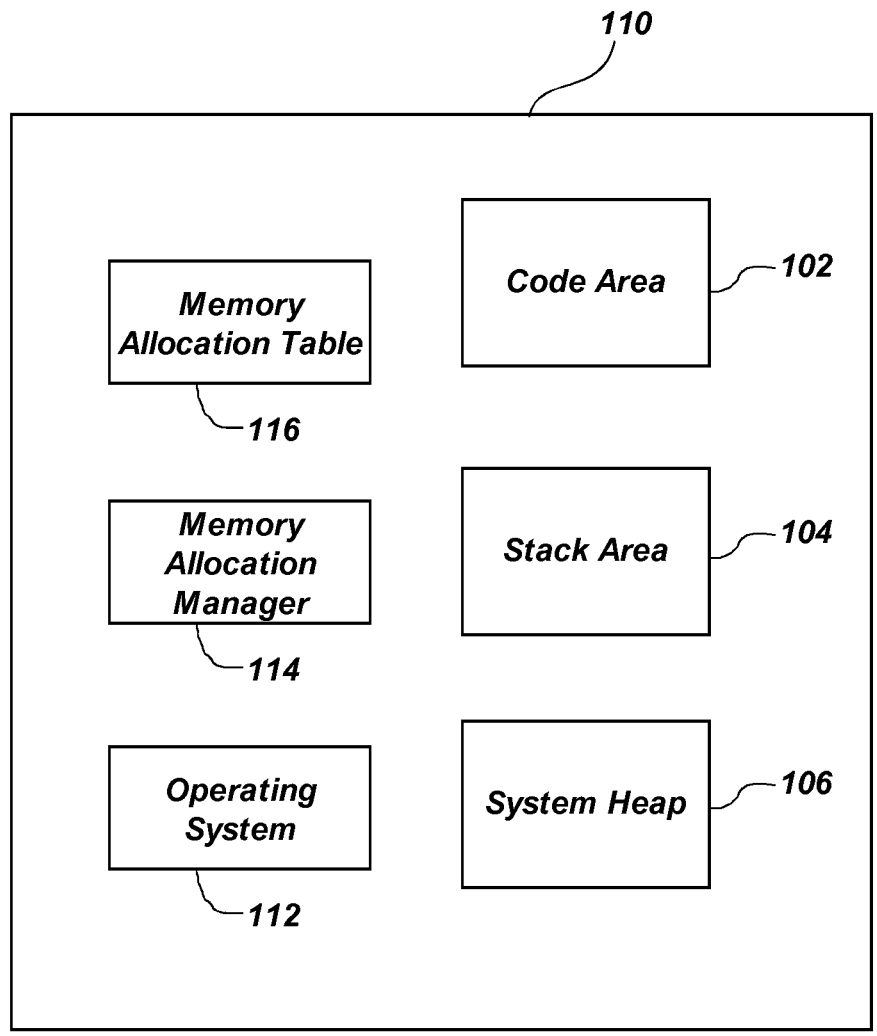
FIG. 1 is a block diagram of a conventional system memory within an electronic device.
Figure 2:
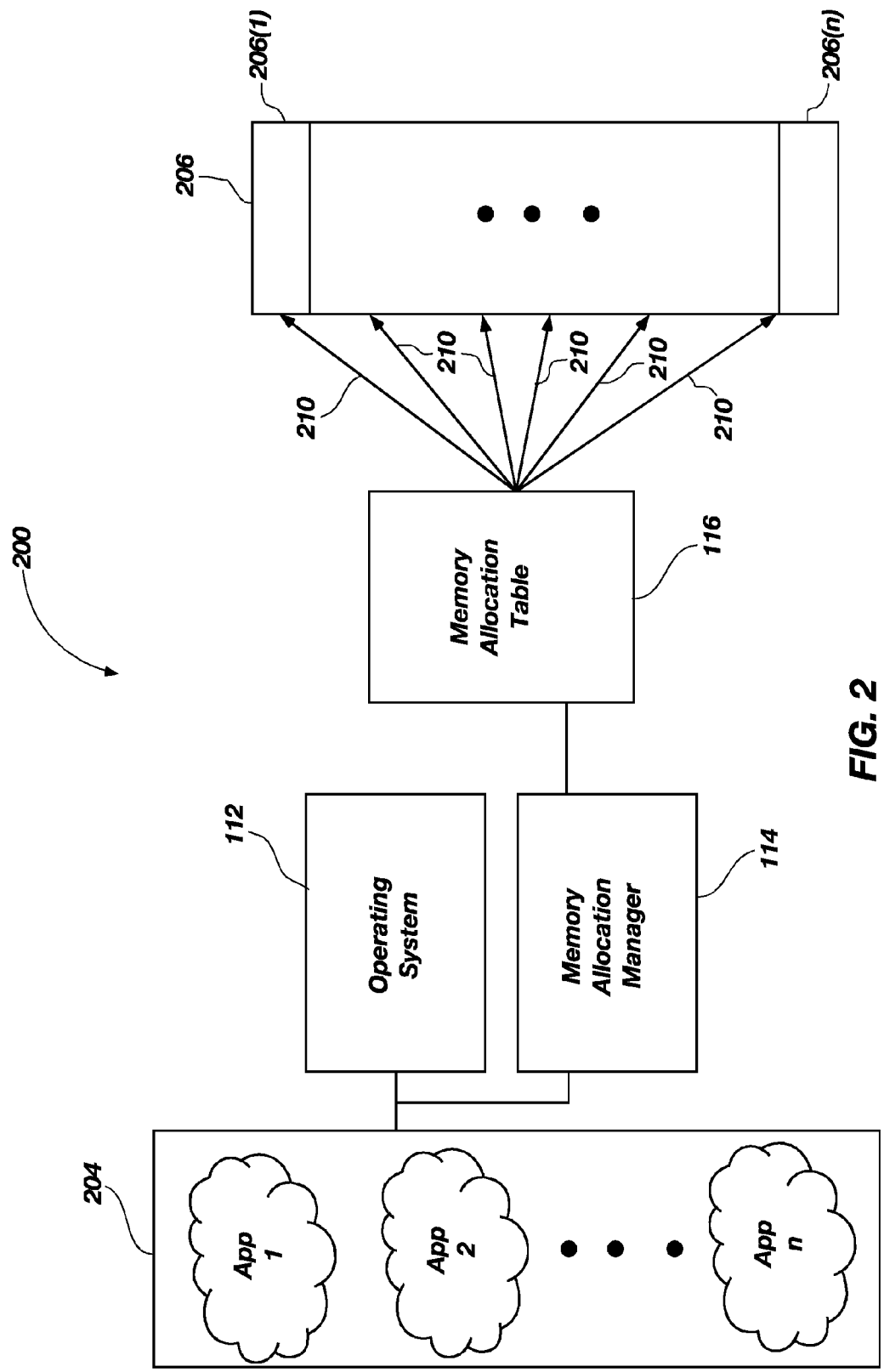
FIG. 2 is a block diagram of a conventional memory management system within an electronic device.

Embodiments of the present invention comprise methods, devices, and systems configured to manage memory blocks within a system memory and activate and deactivate the memory blocks dependent on whether the memory blocks are being at least partially utilized.

In the following detailed description, reference is made to the accompanying drawings which form a part hereof, and in which is shown by way of illustration specific embodiments in which the invention may be practiced. These embodiments are described in sufficient detail to enable those of ordinary skill in the art to practice the invention, and it is to be understood that other embodiments may be utilized, and that structural, logical, and electrical changes may be made within the scope of the present invention.

The following provides a more detailed description of the present invention and various embodiments thereof. In this description, circuits and functions may be shown in block diagram form in order not to obscure the present invention in unnecessary detail. Conversely, specific circuit implementations shown and described are illustrative only and should not be construed as the only way to implement the present invention unless specified otherwise herein. Additionally, block definitions and partitioning of logic between various blocks is illustrative of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths, and that the present invention may be implemented on any number of data signals including a single data signal.

When executed as firmware or software, the instructions for performing the methods and processes described herein may be stored on a computer-readable medium. A computer readable medium includes, but is not limited to, magnetic and optical storage devices, such as disk drives, magnetic tape, CDs (compact discs), DVDs (digital versatile discs or digital video discs), and semiconductor devices, such as RAM, DRAM, ROM, EPROM, and Flash memory.

Further, the term "module" is used herein in a non-limiting sense and solely to indicate functionality of particular assemblies included within embodiments of the invention, and may not be construed as requiring a particular physical structure, or particular partitioning between elements of the invention performing indicated functions.

Those skilled in the art will recognize that many modifications may be made to this configuration without departing from the scope of the present invention. For example, any combination of the above components, or any number of different components, peripherals, and other devices, may be used with the present invention.

Figure 3:
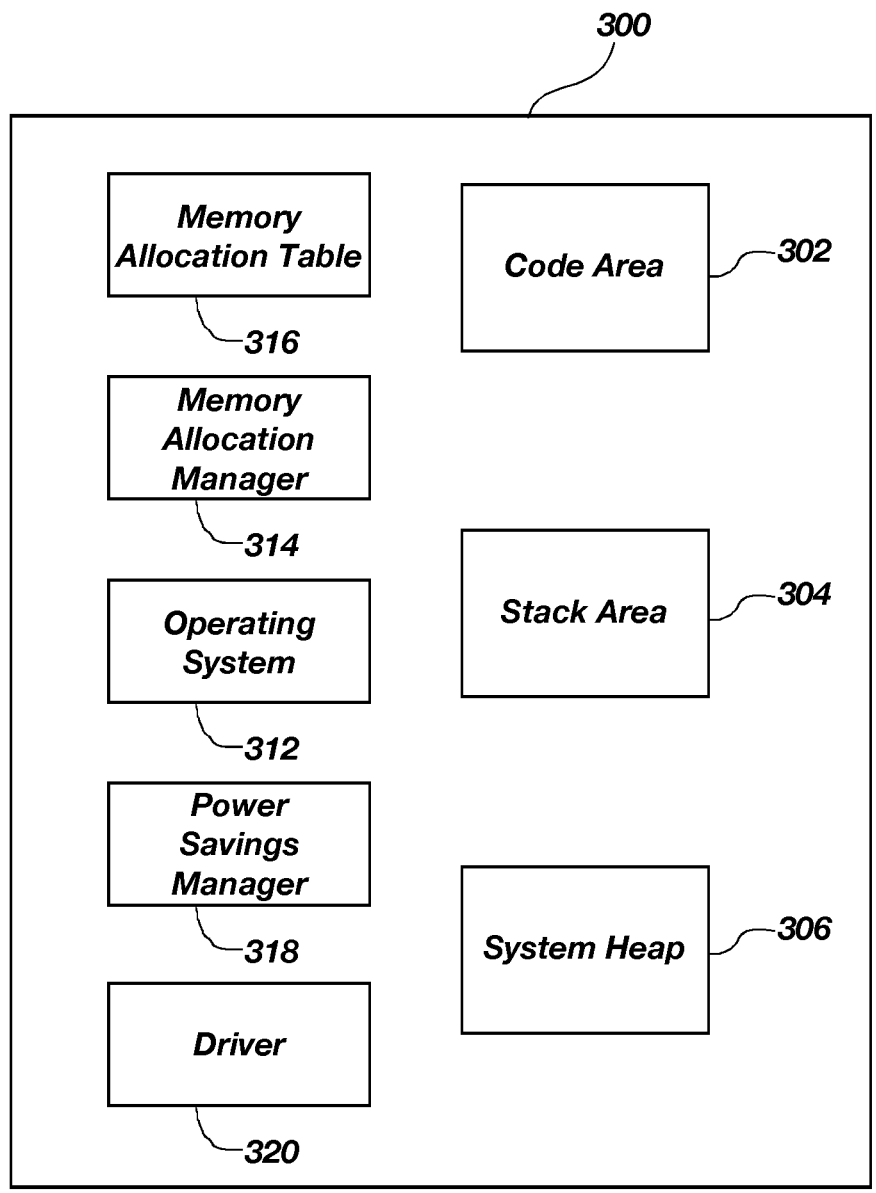
FIG. 3 is a block diagram of a system memory according to an embodiment of the present invention.

FIG. 3 illustrates a system memory 300 according to an embodiment of the present invention. For example, system memory 300 may include non-volatile and/or volatile memory resources. Examples of these memory resources include Flash memory, read-only memory (ROM), random access memory (RAM), etc. Non-volatile and volatile memory can also include memory provided on storage devices, such on disks, drives, and other such form factors. As known by one having ordinary skill in the art, system memory 300 may include system resources, such as code area 302, stack area 304, and system heap 306. System heap 306 may contain all of the unallocated, or "free," memory resources within system memory 300. Furthermore, system memory 300 may include an operating system 312. Examples of operating systems include, but are not limited to, Windows, Mac OS X, UNIX® and Linux.

Furthermore, system memory 300 may include a memory allocation manager 314. Memory allocation manager 314 may be implemented as a module of operating system 312 and may be activated by, for example, an application program requiring additional memory resources. Additionally, for example only, memory allocation manager 314 may be activated by another operating system module, such as a task initiator (not shown), which allocates required resources such as hardware peripherals, files, or memory space to a new application program. Memory allocation manager 314 may be configured to control system heap 306 and to allocate an available memory segment within system heap 306 for use by an application program in order to perform a task. Upon completion of a task, memory allocation manager 314 may be configured to de-allocate the memory segment used by the application program and, thereafter, the memory segment may be returned to system heap 306. In order to assist in the allocation and de-allocation of memory segments, operating system 312 may be configured to implement a memory allocation table 316. Memory allocation table 316 may be configured as a module of operating system 312 and may provide a listing of all memory blocks within a memory device and the status of each memory block, such as "on" or "off." Memory allocation table 316 may also provide a listing of all existing memory segments, including the starting address of each memory segment, the size of each memory segment and the status of each memory segment, such as "available" or "in use."

Figure 4:
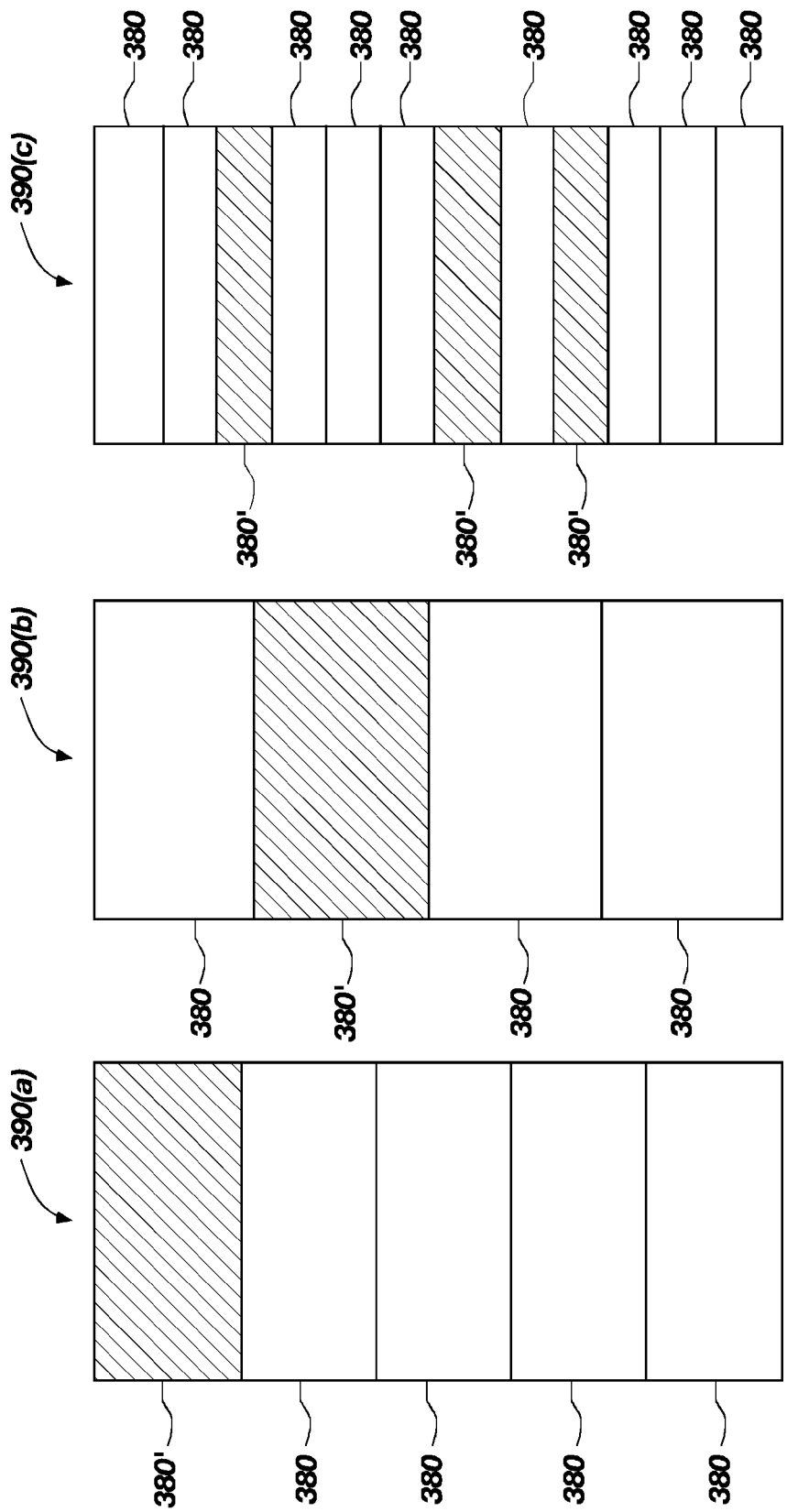
FIG. 4 is a block diagram of various memory devices including memory blocks.

By way of example and not limitation, FIG. 4 illustrates a plurality of memory blocks 380 within various memory devices 390(a), 390(b), and 390(c). As illustrated in FIG. 4, the number of memory blocks 380 within a given memory device 390(a), 390(b), and 390(c) may vary depending on the type of memory device. As described above, during operation of a memory device, memory blocks 380 may include one or more allocated memory segments (not shown), or a single allocated memory segment may be spread out over multiple memory blocks. Furthermore, at a given time during operation of a memory device, it is possible for a memory block to not include any allocated memory segments. As described in more detail below, memory blocks that do not include at least one allocated memory segment may be switched "off." Memory blocks switched "off" are not refreshed and, therefore, do not consume system power. As shown in FIG. 4, memory blocks 380' do not include any allocated memory segments and, therefore, memory blocks 380' have been switched to "off" (indicated by diagonal lines).

Figure 5:
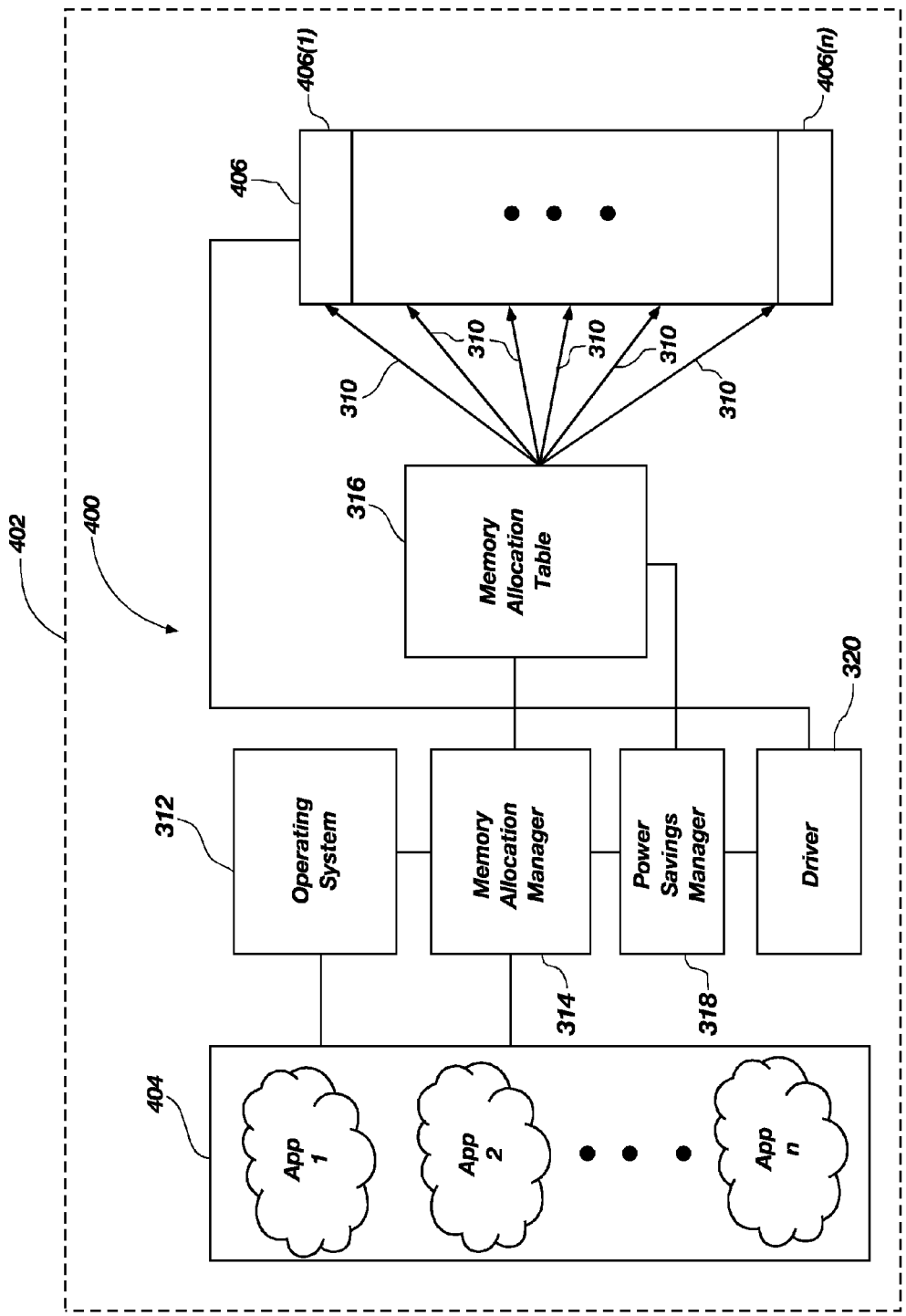
FIG. 5 is a block diagram of a memory management system according to an embodiment of the present invention.

Referring again to FIG. 3, system memory 300 may also include a power savings manager 318 that may be implemented as a level of memory management in addition to memory allocation manager 314. Power savings manager 318 may be configured to allow for, as described more fully below, integration of a PAR feature with an operating system of an electronic device. Power savings manager 318 may be embedded within memory allocation manager 314, or power savings manager 318 may be configured as an individual module of operating system 312, separate from memory allocation manager 314, as shown in FIGS. 3 and 5. Furthermore, power savings manager 318 may be configured to hide the physical details of a memory device (e.g., number of memory blocks, size of memory blocks, and status of memory blocks) from memory allocation manager 314. As a result, a PAR feature may be integrated with operating system 312 independent of the type of memory devices, so long as the memory devices include PAR capability.

Power savings manager 318 may be further configured to monitor a plurality of memory blocks within a memory device and determine whether there are any memory blocks that do not include at least one allocated memory segment. Additionally, power savings manager 318 may be configured to initiate a system call to driver 320. As a non-limiting example, driver 320 may include a memory driver. Driver 320 may be configured to, using memory-specific commands, manage the physical features of a memory device, such as selectively switching memory blocks "on" or "off" as directed by power savings manager 318. For example only, if power savings manager 318 determines that there are one or more memory blocks that do not include at least one allocated memory segment, power savings manager 318 may issue a command to driver 320 to switch the one or more memory blocks "off." Furthermore, if at any time during operation a "switched off" memory block is needed, power savings manager 318 may be invoked by memory allocation manager 314 to determine if there are any inactive memory blocks that may be turned on. Thereafter, power savings manager 318 may initiate a system call to driver 320 to selectively "switch on" an available memory block. In addition, driver 320 may be configured to implement a memory compaction process in order to maximize the number of inactive blocks. A memory compaction process, as known by a person having ordinary skill in the art, involves moving all of the allocated memory segments to adjacent memory locations within a memory device, so as to create a maximum number of memory blocks without allocated memory segments.

FIG. 5 illustrates a memory system 402 including a memory management system 400 and memory devices 406. Memory management system 400 may integrate power savings manager 318 with memory devices 406 having PAR functionality so as to implement a PAR hardware feature with an operating system. As shown in FIG. 5, memory management system 400 may include one or more application programs 404, operating system 312, memory allocation manager 314, memory allocation table 316, power savings manager 318, and driver 320. Memory allocation table 316 includes an entry for each memory block and memory segment within memory devices 406. Furthermore, in order for memory allocation table 316 to provide the address, size, and status of each memory segment entry, each memory segment entry may be mapped (shown by arrows 310) to one or more physical memory segments (406(1) . . . 406(n)) within memory devices 406.

Power savings manager 318 may be configured to hide the physical details of a memory device from other modules, such as memory allocation manager 314, so as to allow for the implementation of memory management system 400 with limited modification to memory allocation manager 314 or other modules of currently existing operating systems. Furthermore, memory management system 400 may be configured to be compatible with all existing memory allocation techniques, such as static memory allocation or dynamic memory allocation.

Some contemplated operations of memory management system 400 will now be described. At least one application of application programs 404 may, for example only, initiate a system call to memory allocation manager 314 to acquire additional memory resources. Upon receiving the system call for memory acquisition, memory allocation manager 314 may search memory allocation table 316, locate available memory segments, and allocate memory segments within system heap 306 (see FIG. 3) to the requesting application. After the memory has been allocated, memory allocation manager 314 may update memory allocation table 316 to display the updated allocation status. Additionally, at least one application of application programs 404 may, for example only, initiate a system call to memory allocation manager 314 to release memory segments being utilized by the application. Upon receiving the system call for a memory release, memory allocation manager 314 may release the memory segments from the application and the memory segments may be returned to system heap 306. After the memory has been de-allocated, memory allocation manager 314 may update memory allocation table 316 to display the updated allocation status.

Furthermore, power savings manager 318 may monitor memory blocks within a memory device and, upon determining that a memory block does not include any allocated memory segments, initiate a system call to driver 320 to deactivate (i.e., switch "off") the memory block. Upon receiving a "switch off" system call, driver 320 may deactivate the memory block. After the memory block has been deactivated, power savings manager 318 may update the memory allocation table 316 to display the updated memory block status. In addition, power savings manager 318 may, upon being notified by memory allocation manager 314 that additional memory space is required, identify available memory blocks that may be inactive and initiate a "switch on" system call to driver 320 to activate the available memory block. Upon receiving the "switch on" system call, driver 320 may activate the memory block. After the memory block has been activated, power savings manager 318 may update the memory allocation table 316 to display the updated memory block status.

Figure 6:
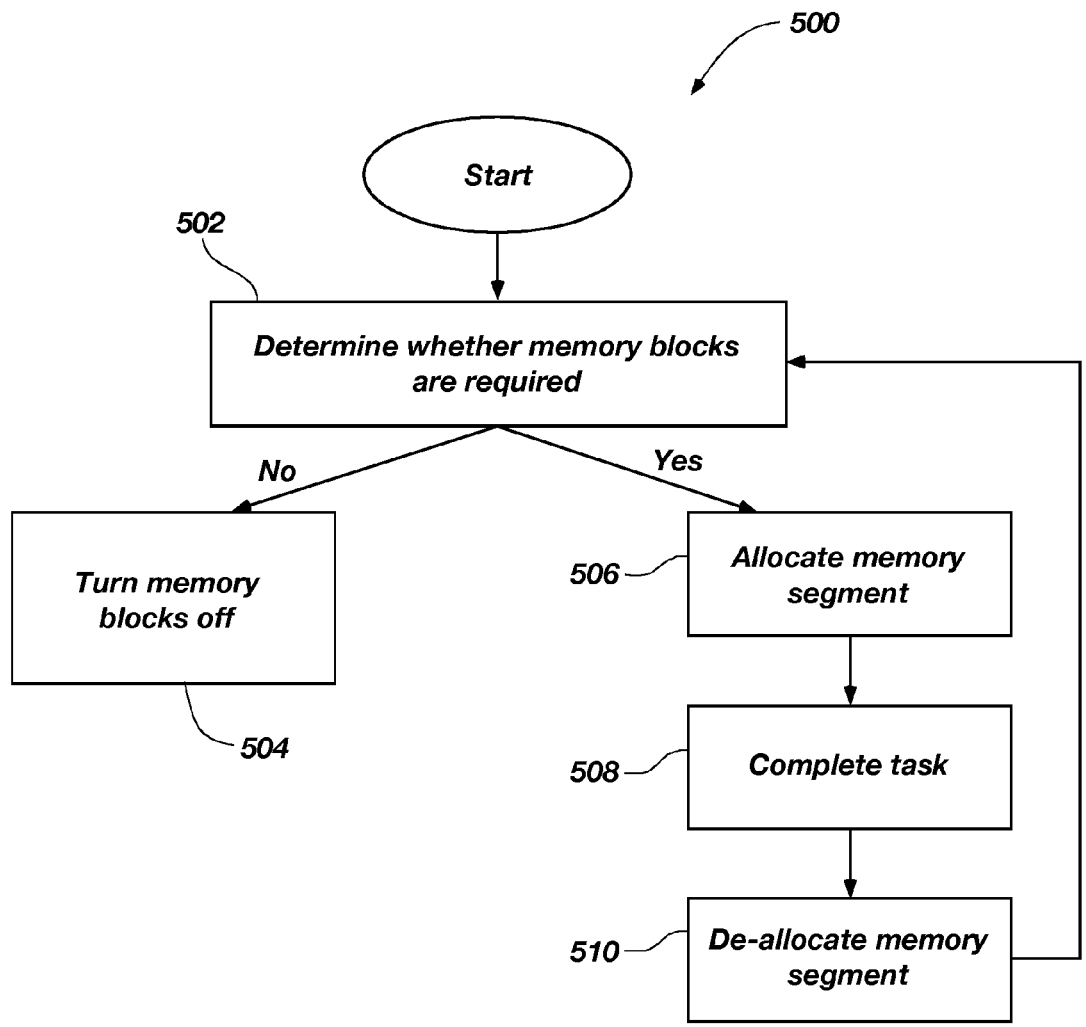
FIG. 6 is a flow diagram illustrating a method of operation of the memory management system described in FIG. 5.

FIG. 6 is a flow diagram of an embodiment of a method of operation of memory management system 400, as depicted in FIG. 5. The management process 500 begins by monitoring a plurality of memory blocks and determining whether memory blocks are required 502 (i.e., make a determination as to whether there is at least one memory block that does not include at least one allocated memory segment). If it is determined that there is at least one memory block that does not include at least one allocated memory segment, the at least one memory block is not required and, therefore, the at least one memory block may be turned "off" 504. If a memory block is required, memory segments within the memory block may be allocated to an application in order to perform a task 506. Upon completion of a task 508, the allocated memory segments may be de-allocated 510 and returned to system heap 306 (see FIG. 3). As illustrated in FIG. 6, after memory segments are de-allocated 510, memory management system 400 (see FIG. 5) may again make a determination as to whether memory blocks, having no allocated memory segments, are required 502. If at any time during process 500, memory allocation manager 314 (see FIGS. 3 and 5) determines additional memory resources are required, memory allocation manager 314 may initiate power savings manager 318 to activate any available memory blocks that are inactive.

Figure 7:
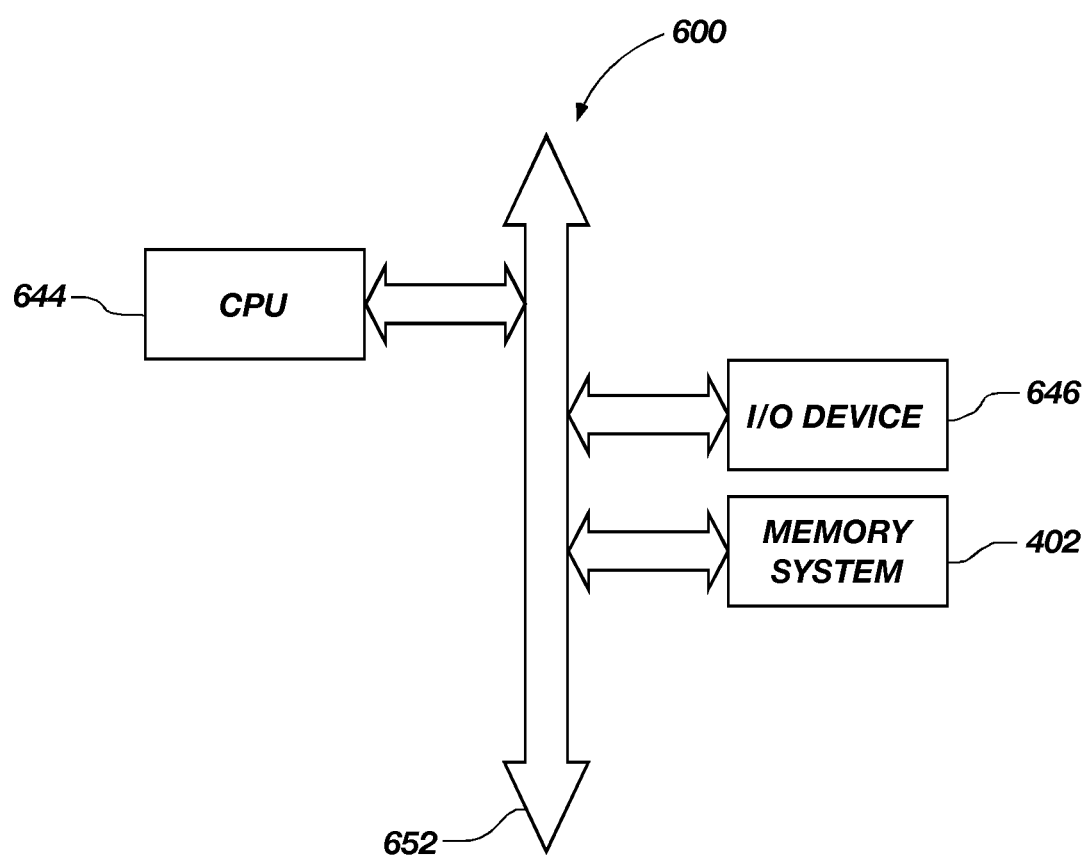
FIG. 7 is an electronic system diagram including a system memory containing a memory management system in accordance with an embodiment of the present invention.

A processor-based system 600 that includes a memory management system in accordance with an embodiment of the present invention is illustrated in FIG. 7. Processor-based system 600, such as a computer system, for example, generally comprises a central processing unit (CPU) 644, for example, a microprocessor, that may communicate with one or more input/output (I/O) devices 646 over a bus 652. Non-limiting examples of I/O devices may include data storage devices, networking devices, data I/O devices (e.g., keyboards, displays, audio/video devices, etc.), etc. The system 600 also includes memory system 402 comprising a power savings manager 318 within a memory management system 400 (see FIG. 5) as described hereinabove.

Specific embodiments have been shown in the drawings and have been described in detail herein; however, the invention may be susceptible to various modifications and alternative forms. It should be understood that the invention is not intended to be limited to the particular forms disclosed. Rather, the invention includes all modifications, equivalents, and alternatives falling within the scope of the invention as defined by the following appended claims and their legal equivalents.

What is claimed is:

1. An apparatus, comprising:
a system memory having a first software module and a second software module stored therein, wherein:
the first software module, when executed, is configured to manage logical features of a memory device, the logical features including management of a memory allocation table having a listing of memory blocks of the memory device; and
the second software module, when executed, is configured to manage hardware features of the memory device including control of physical interfacing with the memory device and activation and deactivation of the memory blocks.

2. The apparatus of claim 1, wherein the first software module includes an operating system stored therein, the operating system including a plurality of application programs configured to execute functions on a computer system.

3. The apparatus of claim 2, wherein the operating system further includes the first software module and the second software module.

4. The apparatus of claim 1, wherein the first software module includes a memory allocation manager configured to allocate and de-allocate memory segments within the memory blocks.

5. The apparatus of claim 4, wherein the second software module includes a power savings manager configured to integrate a partial array refresh (PAR) feature of the memory device with an operating system of the system memory.

6. The apparatus of claim 5, wherein the power savings manager is configured to determine whether individual memory blocks include any memory segments allocated for use by the memory allocation manager.

7. The apparatus of claim 6, wherein the system memory further comprises a driver stored therein, wherein the power savings manager is further configured to initiate a system call to the driver to selectively activate and deactivate the memory blocks.

8. The apparatus of claim 5, wherein the power savings manager is configured to hide physical details of the memory device from the memory allocation manager.

9. The apparatus of claim 1, further comprising the memory device, wherein the memory device includes a partial array refresh (PAR) feature configured to refresh memory blocks that are active, and to not refresh memory blocks that are not active.

10. The apparatus of claim 9, further comprising a processor-based system including a processor operably coupled with the system memory and the memory device.

11. A method of managing semiconductor memory, the method comprising:
managing logical features of a memory device from a first software module including managing a memory allocation table having a listing of memory blocks of the memory device; and
managing hardware features of the memory device from a second software module, separate from the first software module, including physically interfacing with the memory device for activation and deactivation of the memory blocks.

12. The method of claim 11, wherein physically interfacing with the memory device includes:
deactivating a memory block of the memory device responsive to a determination that the memory block does not include an allocated memory segment; and activating the memory block of the memory device responsive to a determination that an available memory block is needed for use.

13. The method of claim 12, wherein deactivating the memory block of the memory device includes:
- initiating a system call from a power savings manager to a driver of the second software module; and
- selectively deactivating the memory block with the driver.

14. The method of claim 12, wherein activating the memory block of the memory device includes:
- initiating a system call from a power savings manager to a driver of the second software module; and
- selectively activating the memory block with the driver.

15. The method of claim 11, wherein managing hardware features includes performing at least one of the following operations using a power savings manager within the second software module:
- monitoring the memory blocks of the memory device;
- initiating a system call to a driver to deactivate the memory block responsive to determining that the memory block does not include any allocated memory segments; and
- activating an available memory block responsive to receiving a notification from a memory allocation manager of the first software module.

16. The method of claim 15, wherein managing logical features includes using the memory allocation manager to update the memory allocation table to include an updated memory block status responsive to a receiving a notification from the power savings manager.

17. The method of claim 11, wherein managing logical features includes:
- receiving a system call by a memory allocation manager indicating a need to acquire additional memory resources;
- searching a memory allocation table to locate available memory segments;
- allocating the available memory segments within a system heap to an application requesting the additional memory resources; and
- updating the memory allocation table to display the updated allocation status.

18. The method of claim 17, wherein managing logical features includes:
- receiving a system call by a memory allocation manager to release memory segments being utilized by the application;
- returning the released memory segments to the system heap; and
- updating the memory allocation table to display the updated allocation status.

19. The method of claim 11, wherein having a listing of memory blocks of the memory device includes at least one of:
- providing a starting address of each memory segment;
- providing a size of each memory segment; and
- providing an availability/in use status of each memory segment.

20. The method of claim 11, further comprising refreshing the memory blocks that are activated and not refreshing the memory blocks that are deactivated.

\* \* \* \* \*